(12) United States Patent
Fritz et al.

(10) Patent No.: US 12,738,180 B2
(45) Date of Patent: Sep. 15, 2026

(54) DUMMY DEVICE FOR SIMULATION OF HUMAN RESPIRATION AND METHOD FOR OPERATING A DUMMY DEVICE

(71) Applicant: 4activeSystems GmbH, Traboch (AT)

(72) Inventors: Martin Fritz, Kobenz (AT); Thomas Wimmer, St. Georg am Längsee (AT)

(73) Assignee: 4activeSystems GmbH, Traboch (AT)

( * ) Notice: Subject to any disclaimer, the term of this patent is extended or adjusted under 35 U.S.C. 154(b) by 327 days.

(21) Appl. No.: 18/460,987

(22) Filed: Sep. 5, 2023

(65) Prior Publication Data

US 2024/0087476 A1 Mar. 14, 2024

(30) Foreign Application Priority Data

Sep. 9, 2022 (DE) ......................... 102022122994.7

(51) Int. Cl.
*G09B 23/32* (2006.01)

(52) U.S. Cl.
CPC .................................... *G09B 23/32* (2013.01)

(58) Field of Classification Search
CPC ........ G09B 23/28; G09B 23/30; G09B 23/32; G09B 23/288
See application file for complete search history.

(56) References Cited

U.S. PATENT DOCUMENTS 4,601,665 A 7/1986 Messmore
5,055,052 A * 10/1991 Johnsen ............... G09B 23/288 601/41
5,330,514 A * 7/1994 Egelandsdal ........ G09B 23/288 434/265
5,393,259 A * 2/1995 Lee ........................ A63H 13/00 446/298
6,227,864 B1 * 5/2001 Egelandsdal ........ G09B 23/288 434/262

(Continued)

FOREIGN PATENT DOCUMENTS

| | | | |
|---|---|---|---|
| DE | 102020130404 | B3 | 2/2022 |
| EP | 3134890 | B1 | 8/2018 |
| KR | 100887375 | B1 | 3/2009 |
| WO | 2019081619 | A1 | 5/2019 |

OTHER PUBLICATIONS

Hoveling, T. et al.; "Simulating the First Breath: Design of the Respiratory Reflex in a Fetal Manikin", 2021 8th International Conference on Biomedical and Bioinformatics Engineering, pp. 163-169; Nov. 12-15, Kyoto, Japan.

(Continued)

*Primary Examiner* — Steve Rowland
(74) *Attorney, Agent, or Firm* — Robert A. Blaha; Smith Tempel Blaha LLC

(57) ABSTRACT

A dummy device includes a torso element which simulates a torso of a human; a respiration simulation element which at least partially covers the torso element, and which is movably arranged with respect to the torso element; and a drive element which is adapted to sequentially move the respiration simulation element away from the torso element and towards the torso element with a respiratory frequency, to simulate a motion characteristic of a human respiration. Embodiments of the invention further relate to a method for operating a dummy device.

18 Claims, 3 Drawing Sheets

(56) References Cited

U.S. PATENT DOCUMENTS

| | | | | |
|---|---|---|---|---|
| 8,016,598 | B2 * | 9/2011 | Eggert | G09B 23/281 434/267 |
| 2002/0107431 | A1 * | 8/2002 | More | A61H 19/32 600/38 |
| 2007/0099538 | A1 * | 5/2007 | Friedland | A63H 3/28 446/342 |
| 2007/0140413 | A1 * | 6/2007 | Saracen | A61B 6/4458 378/207 |
| 2008/0293028 | A1 * | 11/2008 | Mestad | G09B 23/32 434/267 |
| 2012/0329023 | A1 * | 12/2012 | Korneliussen | G09B 23/288 434/267 |
| 2015/0004584 | A1 * | 1/2015 | Galibois | G09B 23/303 434/270 |
| 2017/0169734 | A1 * | 6/2017 | Wen | G09B 23/32 |
| 2019/0259304 | A1 * | 8/2019 | Schwindt | A63H 3/001 |
| 2021/0183270 | A1 * | 6/2021 | Tatarinov | G09B 23/32 |

OTHER PUBLICATIONS

Anonymous: “CPD Dummy”; May 20, 2022; pp. 1-2; XP093115482; Available on the Internet: https://www.messring.de/en/products/active-safety/cpd-dummy/ (downloaded on Jan. 2, 2024).

Giemsa, F; Extended European Search Report in Application No. 23195283.9; Jan. 15, 2024; pp. 1-11; European Patent Office; 80298 Munich, Germany.

* cited by examiner

DUMMY DEVICE FOR SIMULATION OF HUMAN RESPIRATION AND METHOD FOR OPERATING A DUMMY DEVICE

CROSS-REFERENCE TO RELATED APPLICATIONS

This application claims the benefit of the filing date of German Patent Application No. 10 2022 122 994.7, filed Sep. 9, 2022, the disclosure of which is incorporated herein by reference in its entirety.

TECHNICAL FIELD

Embodiments of the disclosure generally relate to the field of dummy devices, and a method for operating a dummy device, respectively.

BACKGROUND ART

In different test systems, for example for the development of assistance systems in the automotive field, dummies are used, such as occupant dummies, pedestrian dummies, motorcycle dummies, or car dummies. Such dummies resemble in at least one aspect the objects or persons which are simulated by the dummies. For example, dummies may have a similar geometrical shape or a similar size as the objects or persons to be simulated. Which properties a dummy shall realistically reproduce depends on the respective purpose of the assistance system to be tested. For example, a car dummy for the test of anticollision systems should, in size and velocity, reproduce a car in traffic and should be recognizable as a car for the anticollision systems. For this purpose, the car dummy could comprise a similar material as a real car, for example. The challenge in the development of suitable dummies significantly differs depending on the application.

SUMMARY

There may be a need to provide a dummy device which realistically reproduces certain motion characteristics of persons, such that different states of the persons, for example different waking or sleeping states, are recognizable or identifiable by the motion characteristics.

This need is met by a dummy device and a method for operating a dummy device according to the independent claims.

According to an aspect of the disclosure, a dummy device is described. The dummy device comprises (i) a torso element which reproduces a torso of a human; (ii) a respiration simulation element which at least partially covers the torso element, and which is arranged or adapted movably with respect to the torso element; and (iii) a drive element which is adapted to sequentially move the respiration simulation element away from the torso element and towards the torso element with a respiratory frequency, to simulate a motion characteristic of a human respiration.

According to a further aspect, a method for operating a dummy device is described. The method comprises providing a dummy device, wherein the dummy device comprises a torso element which reproduces a torso of a human, and a respiration simulation element which at least partially covers the torso element and which is arranged or adapted movably with respect to the torso element. The method further comprises moving a drive element of the dummy device, such that the respiration simulation element sequentially moves away from the torso element and towards the torso element with a respiratory frequency, to simulate a motion characteristic of a human respiration.

OVERVIEW OF EMBODIMENTS

In the context of the disclosure, the term "dummy device" may denote a device which simulates or reproduces an object, in particular with respect to especially relevant properties. The object may be a person, for example a newborn, a baby, a toddler, a child, an adolescent, or an adult. The dummy device may reproduce or simulate an object to be simulated, for example a person to be simulated.

In the context of the disclosure, the terms "reproducing" (German: Nachbilden) or "simulating" may in particular denote, that the dummy device and the object to be simulated are similar or substantially matching in certain properties, for example in the shape, the geometrical dimensions, or a material. In particular, the dummy device and the object to be simulated may match in such properties which are noticeable or recognizable for sensors of test systems. For example, a signal echo at a reflection at the dummy device and the object to be simulated may be similar.

In the context of the disclosure, the term "respiration simulation element" may in particular denote an element of the dummy device which is arranged and adapted to simulate a respiration, in particular the motion characteristic of a respiration. For example, the simulated respiration of the dummy and the respiration of the person to be simulated may match with respect to at least one of a respiratory frequency, a respiratory lifting (German: Atmungshub), a respiratory arrangement, for example in an abdomen region and/or a thorax region. The respiration simulation element at least partially covers the torso element, in particular in an abdomen region, a thorax region, and/or a hip region. For this purpose, the respiration simulation element may be arranged in front of the torso element with respect to a plane which is defined by the shoulders and the hip of the dummy. The respiration simulation element may be arranged in the region of an abdominal wall and/or a chest of the torso element, for example. The respiration simulation element may be deformable. By the deformability, a moveability of the respiration simulation element away from the torso element and towards the torso element may be realizable.

The respiration simulation element may be configured to reflect and/or to emit signal waves. For example, it may reflect signal waves, such that the reflected signal, in particular the difference between incident and reflected signal, is characteristic for the object to be simulated, in particular for a movable part of the object to be simulated.

Signal waves may be each type of signals which are configured wave-shaped, in particular comprise a periodic oscillation, or are at least combinable from wave-shaped signals. Signal waves may be transverse or longitudinal waves. They may be waves which are mechanically bound to a medium, or waves which also propagate in a vacuum. For example, signal waves may be electromagnetic or acoustic waves, in particular radio waves, microwaves, light, x-rays, or radar waves. For example, signal waves may also be laser beams or lidar waves, in particular laser pulses.

In the context of the disclosure, the term "torso element" may in particular denote an element of the dummy device which reproduces a torso of a person or a human. The torso may be defined as a part of a human body without a head and extremities. It may encompass at least one of a thorax region, an abdomen region, and a hip region. That the torso element "reproduces" a torso may in particular denote, that the size ratios of the torso element and the reproduced torso are approximately matching, for example with a deviation of less than 50%, in particular less than 30%, in particular less than 10%. Alternatively or additionally, the mentioned term may denote, that a shape or a profile of the torso element and the reproduced torso are similar or match, in particular comprise at least one of a shoulder region at which extremities can be arranged, a neck region at which a head can be arranged, a thorax region, an abdomen region, and a hip region at which further extremities can be arranged.

A "movable" arrangement of the respiration simulation element with respect to the torso element may denote, that at least parts of the respiration simulation element, in particular the entire respiration simulation element, are movable with respect to the torso element, wherein the motion or the moveability are caused partially, in particular entirely, by a deformation of the respiration simulation element. Correspondingly, the respiration simulation element may be deformable. For example, it may be fixedly mounted or attached to one or more positions at the torso element. The moveability may then result from a stretchability and/or deformability of the respiration simulation element. Furthermore, the respiration simulation element may be separated into different regions. These regions may consist of different materials and/or material compositions, and/or may be separated from each other by a respective separation element, for example an indentation, a groove, or a fold. At the separation element, the respiration simulation element may be especially easily deformable, in particular bendable or tiltable.

In the context of the disclosure, the term "drive element" may in particular denote an element of the dummy device which is adapted to move the respiration simulation element in a pregiven manner, for example corresponding to a pregiven motion characteristic. For this purpose, the drive element may be mechanically coupled with the respiration simulation element. For example, the drive element and the respiration simulation element may directly or indirectly touch each other, such that a force transmission from the drive element to the respiration simulation element is possible. The drive element may, but does not have to, be fixedly connected, for example glued or screwed, to the respiration simulation element. The drive element may comprise a surface which is adapted to move the respiration simulation element away from the torso element and/or towards the torso element. The motion in the direction of the torso element may be performed by an elastic re-formation of the respiration simulation element.

The drive element may be arranged between the torso element and the respiration simulation element. For example, the drive element may be drivable by a respiration simulation actuator, e.g., an electric motor, in particular a linear motor or a servo motor. A servo motor may be defined as an electric motor which enables the control of the angular position of a motor shaft, the rotational velocity, and/or the rotational acceleration. The respiration simulation actuator may, but does not have to, be a part of the drive element. A control unit may be adapted to control the drive element and therefore the motion of the respiration simulation element. The drive element, the respiration simulation actuator and/or the control unit may be arranged at the torso element, may in particular be fixedly connected to the torso element.

The motion of the drive element and/or of the respiration simulation element may be performed along a motion direction which is oriented perpendicularly to a plane which is defined by the shoulders and the hip. The motion may be substantially linear. When the torso element is formed plate-shaped, the motion direction may be perpendicular to the torso plate. In a "sequential" motion, a pregiven sequence is repeated at least once, in particular repeated numerous times, for example at least 10 times or at least 100 times. Thereby, deviations in the sequence may occur. The pregiven sequence may be a simulated respiratory cycle. The sequence may be characterized by a motion of the respiration simulation element away from the torso element and back towards the torso element.

A "respiratory lifting" (German: Atmungshub) may in particular denote the path or the distance which a pregiven region or a pregiven point of the respiration simulation element, for example an abdomen region, a lower thorax region and/or an upper thorax region travels along the motion direction during a respiratory cycle, in particular from a state of maximum "exhalation" to a state of maximum "inhalation", thus between a state in which the respiration simulation element is closest to the torso element, and a state in which the distance between the respiration simulation element and the torso element is maximum. The respiratory lifting may be an average respiratory lifting.

The "respiratory frequency" may be an average respiratory frequency, for example averaged over ten subsequent respiratory cycles, in particular over hundred subsequent respiratory cycles. A respiratory cycle may be defined by a motion of the respiration simulation element away from the torso element and a subsequent motion of the respiration simulation element towards the torso element, in particular such that the arrangement of the respiration simulation element prior to the respiratory cycle corresponds to the arrangement of the respiration simulation element after the respiratory cycle, for example is identical or comprises only low deviations compared with the motion of the respiration simulation element during the respiratory cycle.

In the context of the disclosure, a "motion characteristic of a human respiration" may in particular be characterized by a respiratory frequency, a respiratory lifting, and a respiratory arrangement, for example in an abdomen region and/or a thorax region. The motion characteristic may reproduce a human respiration, as far as it is visible or recognizable from outside. It may be characterized by a respiration profile which indicates the respiratory frequency and/or the respiratory lifting depending on at least two positions in the thorax region and/or the abdomen region, in particular of at least five positions, in particular of at least ten positions. The motion characteristic may be indicative for at least one of a sleeping state, in particular a deep sleeping state, and a state of a light sleep, a wake-up state, a state of falling asleep, and a waking state. Alternatively or additionally, it may be indicative for at least one of a newborn, a baby, a toddler, a child, an adolescent, and an adult.

According to an embodiment, by the dummy device, the function of a test system, for example an assistance system in the automotive field, can be realistically tested. For this purpose, the dummy device may realistically represent, in particular represent such that they are recognized by the test system as objects of a certain type and/or as objects in a certain state, real objects, for example occupants in a vehicle. For example, it may be verified if the test systems can recognize different parameters of a simulated respiration of the test dummy, for example a respiratory frequency and/or a respiratory lifting. With a suitable configuration of the dummy, it may be concluded therefrom, that the test system is able to recognize these parameters also at a real person. Furthermore, it may be verified if the test system can identify certain motion characteristics, wherein the motion characteristics may be indicative for certain states of persons which correlate with the respiration, for example a sleeping state or a waking state, and/or may be indicative for certain types of persons, for example a baby, a toddler, or an adult. Dummy devices may be used when tests with real persons, for example due to the required time effort for the test persons, are to cost-intense and/or are not possible due to a dangerous situation, for example in crash tests.

According to an embodiment, the respiration simulation element covers an abdomen region of the torso element and a thorax region of the torso element respectively at least partially. The abdomen region and the thorax region of the torso element may be arranged in an analogous manner to these regions at a real person. The thorax region or the chest region may encompass a region of the torso element which is arranged below a head of the dummy device. The thorax region may comprise an upper thorax region in the vicinity of the head and a lower thorax region which is adjoining the abdomen. The abdomen region may encompass a central region of the torso element between the thorax region and the hip region. The hip region may encompass a region of the torso element which is opposing to the head. Such an embodiment may be advantageous to realistically simulate the respiratory motion of a person, since respiratory motions typically encompass both, a motion of the abdomen wall and of the thorax, in particular the chest.

According to a further embodiment, the drive element is arranged in the abdomen region, such that a respiratory lifting in the abdomen region is larger than a respiratory lifting in the thorax region, in particular at least twice or at least three times as large. For example, a maximum respiratory lifting in the abdomen region may be larger than a maximum respiratory lifting in the thorax region, in particular at least twice or at least three times as large. Such an embodiment may be advantageous, to realistically simulate the respiration of different types of persons. An especially strong respiratory motion in the abdomen region compared to the thorax region may be characteristic for newborns, babies, or toddlers.

The respiratory lifting of an adult in an abdominal region or abdomen region may be 7 mm, in a lower thorax region 4 mm and/or in an upper thorax region 3 mm. The respiratory lifting of a 6- to 7-year-old child in an abdomen region may be 7 mm, in a lower thorax region 4 mm and/or in an upper thorax region 3 mm. The respiratory lifting of a 2-year-old toddler in an abdomen region may be 7 mm, in a lower thorax region 4 mm and/or in an upper thorax region 3 mm. The respiratory lifting of a 9- to 12-month-old baby in an abdomen region may be 3.5 mm, in a lower thorax region 2 mm and/or in an upper thorax region 1.5 mm. The respiratory lifting of a 0- to 3-month-old newborn in an abdomen region may be 3.5 mm, in a lower thorax region 3 mm and/or in an upper thorax region 0 mm.

According to a further embodiment, a ratio of a respiratory lifting in the thorax region to a respiratory lifting in the abdomen region may be adjustable, for example, by different implementations of the respiration simulation element, for example its elasticity and/or by a further drive element, for example a further plunger or a further air bag. Additionally or alternatively, a respiratory lifting in an upper thorax region in relation to a respiratory lifting in a lower thorax region may be adjustable. For example, no or only a little respiratory motion in the upper thorax region may be performed, in particular to simulate the respiration of a newborn.

According to a further embodiment, the dummy device comprises a further drive element, for example a further plunger or a further air bag. The further drive element may be adapted to sequentially move the respiration simulation element and/or a further respiration simulation element away from the torso element and towards the torso element with the respiratory frequency or a further respiratory frequency, to reproduce a motion characteristic of a human respiration. The further respiration simulation element may have similar properties as the respiration simulation element. The further drive element may have similar properties as the drive element. The further drive element may be arranged offset to the drive element at the torso element. For example, the drive element may be arranged in an abdomen region, and the further drive element may be arranged in a thorax region or vice versa.

According to a further embodiment, the dummy device comprises a respiration simulation actuator which is adapted to drive the drive element, and a further respiration simulation actuator which is adapted to drive the further drive element. Both actuators may be controllable independently from each other, in particular by a control unit. Additionally or alternatively, they may be controllable depending on each other, for example with the same frequency and/or by a coordinated respiratory lifting. By both actuators, a path of the abdomen and/or a path of the thorax may be adjustable.

According to a further embodiment, a respiratory frequency is controllable by the drive element. Such a respiratory frequency may be indicative for a simulated person, for example a newborn, a baby, a toddler, a child, an adolescent, or an adult. The respiratory frequency of an adult may be approximately 12 respirations per minute. The respiratory frequency of a 6- to 7-year-old child may be 18 respirations per minute. The respiratory frequency of a 2-year-old toddler may be 22 respirations per minute. The respiratory frequency of a 9- to 12-month-old baby may be 30 respirations per minute. The respiratory frequency during sleep may be lower than in a wakening state.

According to a further embodiment, the drive element comprises at least one of a plunger, in particular a plunger with a plate-shaped end part, which pushes against the respiration simulation element, and an inflatable bellow (German: Balg), an inflatable air bag, or an inflatable air blister, for example a bellow, an air bag, or an air blister with one chamber or multiple chambers. A chamber of such a multi-chamber bellow, air bag, or air blister may be arranged in a thorax region, and a further chamber may be arranged in an abdomen region, in particular to control a relation of the thorax respiration to the abdomen respiration.

According to a further embodiment, the dummy device further comprises a compressor which is adapted to pump a gas, in particular air, in the inflatable air bag and/or out of the inflatable air bag. Moreover, the dummy device may comprise a gas reservoir or gas container, in particular an air container, from which and/or in which the compressor pumps the gas in the air bag and/or out of the air bag. The compressor and/or the gas reservoir may be arranged in a reproduced torso of a human. Alternatively, the compressor and/or the gas reservoir may be arranged outside of a reproduced torso, in particular outside of a reproduced person. The compressor and/or the gas reservoir may, but do not have to, be arranged between the torso element and the respiration simulation element. The compressor and/or the gas reservoir may be attached to the torso element. Alternatively, the compressor and/or a gas reservoir may be connected with the torso element and the respiration simulation element only by an air tube or a plurality of air tubes, wherein the air tube(s) may be adapted to transport a gas between the respiration simulation element and the compressor and/or the gas reservoir.

According to a further embodiment, the drive element comprises a respiration simulation actuator which drives the motion of the respiration simulation element. The respiration simulation actuator may be controlled by a control unit. For example, such a respiration simulation actuator may be adapted to move a plunger forth and back, for example in a linear motion along the plunger axis. The respiration simulation actuator may be adapted to inflate and/or to evacuate a bellow or an air bag, wherein evacuating may be performed or at least supported by an elastic restoration force of the respiration simulation element. The signal transmission between the control unit and the respiration simulation actuator may be performed by a radio transmission and/or by a cable. The control may be performed via ethernet. Instructions, in particular control instructions, may be transmitted by a user data protocol (UDP).

According to a further embodiment, the drive element comprises an end part which pushes against the respiration simulation element, wherein the end part extends at least partially in a recess of the respiration simulation element. The recess may be a hole in the respiration simulation element. The hole may be connected with a respiration slit in the respiration simulation element, may in particular merge with the respiration slit. The recess may be the respiration slit. An outline of the recess may correspond to a shape of the end part. The end part may form the tip of the drive element. The end part may be arranged such that it does not protrude beyond an outer surface of the respiration simulation element. Such an embodiment may be advantageous to ensure an accurate positioning of the drive element with respect to the respiration simulation element.

According to a further embodiment, the end part tapers with increasing distance to the torso element. In particular, the end part may comprise at least one of a conical tip, in particular a frustoconical tip, a curved tip, and a sphere-shaped tip. The drive element inclusively the end part may be configured mushroom-shaped, wherein the end part corresponds to the cap of the mushroom. Such an embodiment may be advantageous, to ensure an accurate positioning of the drive element with respect to the respiration simulation element. In particular when a recess, in which the end part extends, is connected with a respiration slit, such an embodiment may also contribute to widening the respiration slit, when the drive element is moved away from the torso element. Thereby, an especially realistic respiratory motion may be simulatable.

According to a further embodiment, the respiration simulation element comprises a plurality of ribs. In this way, the respiration simulation element, in particular when it is plate-shaped, may be separated by corresponding slits into a plurality of ribs. The ribs may be arranged in an arbitrary direction, for example, in an analogous manner to human ribs. However, they may also be arranged along a longitudinal axis of the simulated human torso, in particular an axis which is directed from the shoulder region to the hip region. The ribs may be arranged along a main extension axis of the respiration simulation element and/or perpendicular to it. The ribs may be arranged in a thorax region and/or an abdomen region. The plurality of ribs may encompass two, three, four, five, more than five, or more than ten ribs. By separating the respiration simulation element into ribs, a respiratory motion may be simulatable in an especially realistic manner, for example also a lateral extension of abdomen and thorax.

According to a further embodiment, the end part is configured arc-shaped. Such an embodiment may be advantageous with respect to a more homogenous pressure distribution by the drive element onto the respiration simulation element. When the respiration simulation element comprises a plurality of ribs, the arc may extend orthogonal to the ribs. Thereby, it may be possible to suitably distribute the force which is exerted by the drive element on the ribs.

According to a further embodiment, the respiration simulation element comprises a plurality of ribs and the drive element comprises an arc-shaped end part which pushes against the ribs. Such an embodiment may be advantageous to suitably distribute the force which is exerted by the drive element on the ribs.

According to a further embodiment, the respiration simulation element comprises at least one of a rib, in particular a plurality of ribs, a membrane, for example an elastic membrane, and a plate, in particular a flexible plate. The membrane or the plate may be arranged between different regions of the torso element, in particular between a shoulder region and a hip region, and/or may be supported by the drive element. The respiration simulation element may be attached to the torso element, in particular in a shoulder region of the torso element and/or in a hip region of the torso element. The respiration simulation element may consist of or comprise an outer sleeve of the dummy device, in particular in an abdomen region and/or a thorax region, for example an outer sleeve which reproduces a skin or a clothing of the baby dummy. The respiration simulation element may comprise the outer sleeve additionally to the ribs, the plate, and/or the membrane. Such an embodiment may be advantageous to realistically reproduce the respiratory motion in the abdomen region and the thorax region.

According to a further embodiment, the respiration simulation element comprises a thickness or wall thickness between 1 and 10 mm. The thickness may be a thickness of the flexible plate, the membrane, and/or at least one of the plurality of ribs, in particular of all ribs. The thickness may be substantially defined in parallel to the motion direction of the plunger.

According to a further embodiment, a material of the respiration simulation element comprises an elastic modulus between 200 and 1400 MPa. In the context of the disclosure, an "elastic modulus" may in particular mean a material parameter which describes the connection between tension and strain during the deformation of a solid body with linear elastic behavior. The elastic modulus of a material may describe the tensile stress at which a tension rod made of this material doubles in length. A material with such an elastic modulus may be advantageous to realistically simulate a human respiration. The material of the respiration simulation element may be or comprise plastic.

According to a further embodiment, the respiration simulation element comprises a respiration slit which widens, in particular broadens, when the respiration simulation element is moved away from the torso element by the drive element. The respiration slit may narrow when the respiration simulation element is moved towards the torso element. Narrowing the respiration slit may be achieved by the elasticity of a material of the respiration simulation element. The respiration slit may extend in an arbitrary direction. For example, it may be oriented along a longitudinal axis of the torso. Such a longitudinal axis may extend from the shoulder region to the hip region. The respiration slit may be arranged centrally in the respiration simulation element, in particular such that it divides the plate into same halves. By widening the respiration slit, it may be possible to move the halves of the respiration simulation element a little towards the side. The widening of the slit may be achieved or supported by a conical or sphere-shaped end part of a plunger. By such an embodiment, an especially natural respiratory motion may be realizable.

According to a further embodiment, the respiration simulation element is attached at the torso element by an attachment element, in particular by a plurality of attachment elements. The attachment elements may be arranged in a shoulder region and/or a hip region. At least one of the attachment elements may be movably arranged in a rail and/or a slit. For example, the respiration simulation element may comprise the slit and/or the rail. Alternatively or additionally, the torso element may comprise the slit and/or the rail. The slit and/or the rail may enable a restricted moveability, for example along only one motion direction and/or only along a pregiven length of the rail or the slit. Such an attachment may ensure an improved movable attachment of the respiration simulation element at the torso element, for example for a more realistic simulation of a respiration.

According to a further embodiment, the dummy device further comprises an extremity element which is movably connected with the torso element by a joint, and an extremity drive element which is adapted to move the extremity element around the joint, such that a further motion characteristic of a human extremity motion is reproduced. The joint may be a pivoting joint or a ball joint. The joint may comprise multiple pivoting points, in particular two or three.

By the extremity element, an arm or a leg may be simulatable. The dummy device may comprise a plurality of extremity elements, for example two, three, four, five, or more than five. They may have a similar structure or a different structure. By the extremity element, motion characteristics of an arm motion and/or a leg motion may be simulatable.

The extremity drive element may comprise an extremity actuator, for example an electric motor, in particular a linear motor or a servo motor. The extremity actuator may be adapted to drive the extremity motion. A control unit may be adapted to control the extremity actuator. The control unit may be arranged on the torso element or may also be arranged outside of the dummy device. Signals of the control unit may be transmitted via a cable and/or radio.

The further motion characteristic may be characterized by at least one of a rotational angle of the extremity element, an amplitude of the extremity motion, a frequency of extremity motions, a relative motion of different parts of the extremity element with respect to each other, and a temporal distribution of extremity motions in a pregiven time interval.

Such an embodiment may be advantageous, since the further motion characteristic, in particular in combination with the motion characteristic, may allow conclusions to a state of the dummy device and/or a state of the person which is simulated by the dummy device.

According to a further embodiment, the motion characteristic and/or the further motion characteristic are indicative for at least one of a sleeping state and a waking state, in particular for at least one of a deep sleeping state, a state of light sleep, a wake-up state, a state of falling asleep, and a waking state. For example, in a sleeping state, the respiratory frequency and/or the respiratory lifting may be smaller than in a waking state.

A deep sleeping state, in particular of a newborn or a baby, may be characterized by only one respiratory motion, but no extremity motion, being performed. A state of light sleep, in particular of a newborn or a baby, may be characterized by a respiratory motion and an irregular, little extremity motion being performed. A wake-up state, in particular of a newborn or a baby, may be characterized by a respiratory motion and an irregular, slow extremity motion being performed. A waking state, in particular of a newborn or a baby, may be characterized by a respiratory motion and an irregular, fast extremity motion being performed.

Such an embodiment may be advantageous for the simulation of the mentioned states, in particular to test the functionality of assistance systems which shall be capable to recognize corresponding states of real persons, in particular of newborns or babies.

According to a further embodiment, the motion characteristic and/or the further motion characteristic is indicative for (the respiration and/or extremity motion) of the at least one of a newborn, a baby, a toddler, a child, an adolescent, and an adult. For example, the respiratory frequency, in particular a respiratory frequency in rest, may decrease over the course of life, and/or the respiratory lifting with respect to the body size may decrease over the course of life. Moreover, the extremity motion may be more targeted or coordinated in the course of life.

Such an embodiment may be advantageous to simulate different types of persons, in particular to test the functionality of assistance systems which shall be capable to differentiate such types of persons, for example a newborn from a one-year-old baby. This may be useful, since for a newborn, other security devices may be required than for a one-year-old baby.

According to a further embodiment, the extremity drive element is adapted to irregularly move the extremity element around the joint, in particular (statistically) independently from the motion of the respiration simulation element. An "irregular" motion may be characterized by the motion range and/or the motion direction of subsequent movements being distinctly deviating from each other. Alternatively or additionally, an irregular motion may be characterized by a wide range of different motion directions and/or different motion ranges being realized. An irregular motion may be characterized by the point in time of the motion being random. An irregular motion may be characterized by not being targeted, for example in contrast to a targeted gripping motion. An irregular motion may be characterized by being (statistically) performed independently from the respiratory motion.

Such an embodiment may be advantageous, since sleeping motions (also of adults) may be irregular, and/or since motions of newborns or babies may be irregular. Correspondingly, irregular motions may be indicative for such states.

According to a further embodiment, the extremity drive element is adapted to move the extremity element depending on the motion of the respiration simulation element. Such an embodiment may be advantageous to simulate the states in which the respiratory motion and the extremity motion correlate, for example due to a mechanical connection via bones, muscles, tendons or the like.

According to a further embodiment, the extremity element is mechanically coupled, in particular by the extremity drive element, to the respiration simulation element and/or the drive element. A mechanical coupling may be generated by a joint, a connection piece, or a thread, for example. By such a coupling, an autonomous actuator for the extremity element may be dispensable. Furthermore, by such a coupling, a dependency of the respiratory motion and the extremity motion may be generatable in a simple manner.

According to a further embodiment, the extremity element comprises a limb near to the torso, which is movably connected with the torso element by the joint at a first limb end, and a limb spaced apart from the torso, which is movably connected by a further joint with the limb near the torso at a second limb end of the limb near to the torso which is opposing the first limb end. Such an embodiment may be advantageous to realistically illustrate movements of extremities, for example of an arm or a leg, in particular to be able to simulate a shank motion around a knee joint or a forearm motion around an elbow joint. The further joint may be a pivoting joint or a ball joint. It may comprise multiple pivoting points, in particular two or three. An actuator may be adapted to drive the limb near the torso, wherein the limb spaced apart from the torso is driven only indirectly.

According to a further embodiment, the limb near the torso comprises a first limb part which connects a first pivoting point of the joint with a first further pivoting point of the further joint, and a second limb part which connects a second pivoting point of the joint with a second further pivoting point of the further joint.

The first pivoting point and the second pivoting point may be spatially offset with respect to each other. Both pivoting points may be arranged at the torso element. The extremity drive element may be adapted to move the first limb part around the first pivoting point of the joint. The motion of the second limb part around the second pivoting point may be performed in dependency. The first further pivoting point and the second further pivoting point may be arranged in a spatially offset manner at the limb spaced apart from the torso. The motion of the limb spaced apart from the torso may be performed depending on the motion of the first limb part around the first pivoting point.

Such an embodiment may be advantageous, to reproduce a tilting of the limb spaced apart from the torso with respect to the limb near to the torso in the context of a further motion characteristic. Such a tilting may be characteristic for certain states of a simulated person, for example for a sleeping state of a baby. By both limb parts and the offset arrangement, a kinking between the limb near to the torso and the limb spaced apart from the torso may be controllable. Insofar, an own actuator for the limb spaced apart from the torso may be dispensable.

According to a further embodiment, the dummy device comprises a head element which is rotatably connected to the torso element by a neck joint. The motion of the head element may be drivable by a head actuator. A head motion characteristic which is reproduced by the motion of the head element may be indicative for at least one of a deep sleeping state, a state of light sleep, a wake-up state, a state of falling asleep, and a waking state. Alternatively or additionally, the head motion characteristic may be indicative for at least one of a newborn, a baby, a toddler, a child, an adolescent, and an adult.

According to a further embodiment, a heartbeat and a pulse are simulatable, wherein the heartbeat and/or the pulse may be performed depending on the respiratory motion.

According to a further embodiment, the torso element and the respiration simulation element are at least partially embedded in a viscous substance. The entire dummy device may be embedded in the viscous substance. The viscous substance may be elastic and/or bendable. A respiratory motion and/or an extremity motion may be reproducible by the viscous substance. The respiration simulation element, the extremity element, and/or the head element may, but do not have to, encompass respective spatially neighbored regions of the viscous substance. The viscous substance may be adapted to at least partially reflect an incident signal. The viscous substance may be advantageous, to realistically simulate the shape and/or the materiality of a person to be reproduced.

According to a further embodiment, a test system comprises the dummy device. Additionally, the test system comprises a transmitter which is configured to send signal waves, wherein the dummy device is configured to reflect the sent signal. Furthermore, the test system comprises a receiver which is configured to receive the reflected signal, and a signal processing unit which is configured to analyze the received signal and to recognize a state of the dummy device.

It is noted that described embodiments merely constitute a limited selection of possible embodiment variants of the invention. Thus, it is possible to combine the features of single embodiments in a suitable manner with each other, so that, for a skilled person, a plurality of different embodiments are to be considered as obviously disclosed by the explicitly disclosed variants. In particular, some embodiments of the invention are described with device claims and other embodiments of the invention are described with method claims. However, when reading this application, it becomes immediately clear for the skilled person, that, unless explicitly otherwise noted, additionally to a combination of features which belong to one type of inventive subject-matter, also an arbitrary combination of features is possible, which belong to different types of inventive subject-matters.

DETAILED DESCRIPTION OF ILLUSTRATED EMBODIMENTS

Figure 1:
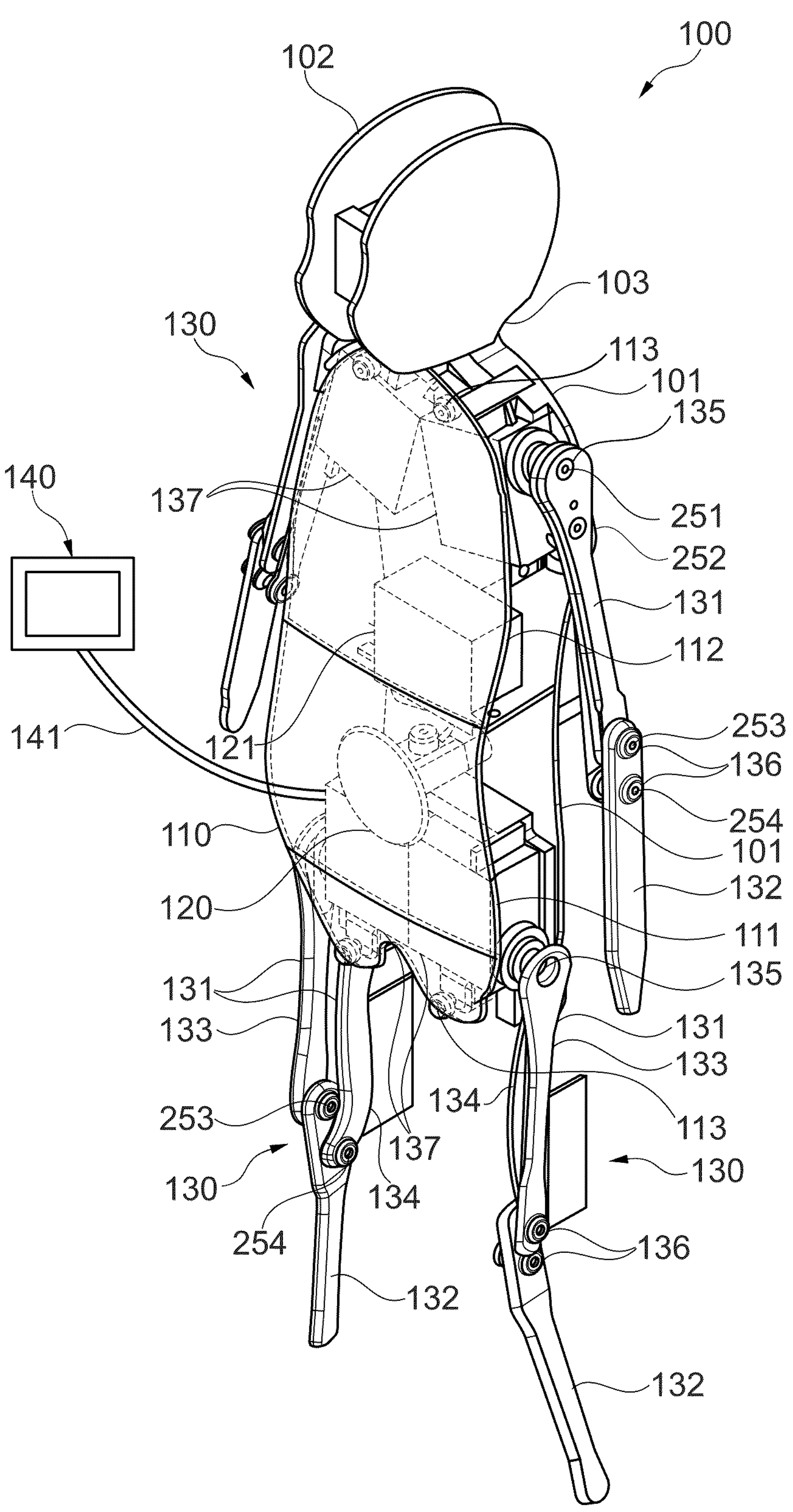
FIG. 1 is a perspective illustration of a dummy device according to an embodiment of the disclosure.

The illustrations in the drawings are schematically presented. In different drawings, similar or identical elements are provided with the same reference signs.

A further explanation for an improved understanding of embodiments of the disclosure is provided in more detail with reference to the accompanying drawings.

FIG. 1 shows a perspective view of a dummy device 100. The dummy device 100 comprises (i) a torso element 101 which reproduces a torso of a human, (ii) a respiration simulation element 110 which at least partially covers the torso element 101 and which is movably arranged with respect to the torso element 101, and (iii) a drive element 120 which is adapted to sequentially move the respiration simulation element 110 away from the torso element 101 and towards the torso element 101 with a respiratory frequency, to reproduce a motion characteristic of a human respiration.

The respiration simulation element 110 is separated into an abdomen region 111 and a thorax region 112, wherein the drive element 120 is arranged in the abdomen region 111. Furthermore, the respiration simulation element 110 is attached at the torso element by attachments 113, here by screws. The attachments 113 are located in a neck region and a hip region of the dummy device 100.

The drive element 120 is arranged between the respiration simulation element 110 and the torso element 101. The drive element 120 comprises a cylindrical plunger which leads to a circular plate which pushes against the respiration simulation element 110 from below. Moreover, the drive element 120 comprises a respiration simulation actuator 121 which is arranged at the torso element 101 and may reciprocate the plunger.

A head element 102 is arranged above the torso element 101, in particular above a shoulder region of the dummy device 100 and is rotatably and/or pivotably connected with the torso element 101 via a neck joint 103. The motion of the head element 102 is driven by a head actuator.

Two extremity elements 130 are movably fixed to the torso element 101 in a shoulder region of the dummy device 100 by a respective joint 135. Both extremity elements 130 simulate a right and left arm. The extremity elements 130 respectively comprise a limb 131 near to the torso and a limb 132 spaced apart from the torso, which are movably connected to each other by a further joint 136. The limb 131 near to the torso respectively comprises a first limb part 133 and a second limb part 134.

The first limb part 133 connects a first pivoting point 251 of the joint 135 with a first further pivoting point 253 of the further joint 136. The second limb part 134 connects a second pivoting point 252 of the joint 135 with a second further pivoting point 254 of the further joint 136. The first and the second pivoting point 251, 252 are spatially offset from each other arranged at the torso element 101. The first and the second further pivoting point 253, 254 are spatially offset from each other arranged at the limb 132 spaced apart from the torso. The different pivoting points 251, 252, 253, 254 are respectively located at ends of the limb 132 spaced apart from the torso and of the limb 131 near to the torso, and its limb parts 133, 134, respectively. The extremity drive element 137 controls a rotating motion of the first limb part 133 around the first pivoting point 251. Thereby, corresponding motions around the other pivoting points 252, 253, 254 are pregiven or at least restricted. The extremity drive element 137 comprises an extremity actuator. The extremity actuator is arranged at the torso element 101 and is fixedly connected with it.

Furthermore, two extremity elements 130 are movably attached in a hip region of the dummy device 100 at the torso element 101 by a joint 135. Both extremity elements 130 simulate a left leg and a right leg. They are constructed in an analogous manner to the previously explained extremity elements 130 which simulate a left and a right arm.

The motion of the actuators 121, 137 is controlled by a control unit 140 which is connected with the dummy device 100 by a signal conductor 141. The control unit 140 is arranged outside of the dummy device 100 but may also be arranged within the dummy device 100, in particular at the torso element 101. Each actuator 121, 137 may comprise a respective control unit 140 which may be integrated in the actuator 121, 137, and/or may be formed outside of the actuator 121, 137.

Figure 2:
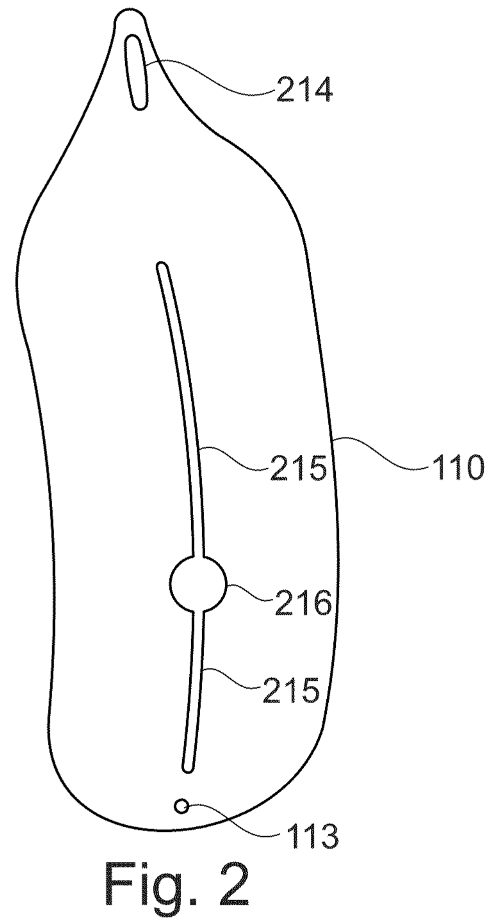
FIG. 2 shows a respiration simulation element according to an embodiment of the disclosure, FIG. 3 a perspective illustration of a dummy device with a respiration slit according to an embodiment of the disclosure.

FIG. 2 shows a respiration simulation element 110 which is adapted in a plate-shaped manner with a respiration slit 215 which is centrally arranged in the respiration simulation element 110. The respiration slit 215 extends along a main extension direction of the respiration simulation element 110, i.e., along a direction in which the respiration simulation element 110 is extended to its maximum. The respiration slit 215 extends over an abdomen region and a thorax region of the torso. In a central region, the respiration slit 215 widens to a recess 216, here a circular hole in the respiration simulation element 110.

At opposing ends of the respiration simulation element 110, respectively one attachment device 113, 214 is provided. At the tapering upper end of the respiration simulation element 110, corresponding to a neck region, the attachment device comprises an attachment slit 214, such that the respiration simulation element 110 may be movably attached with a certain clearance, for example at a torso element.

Figure 3:
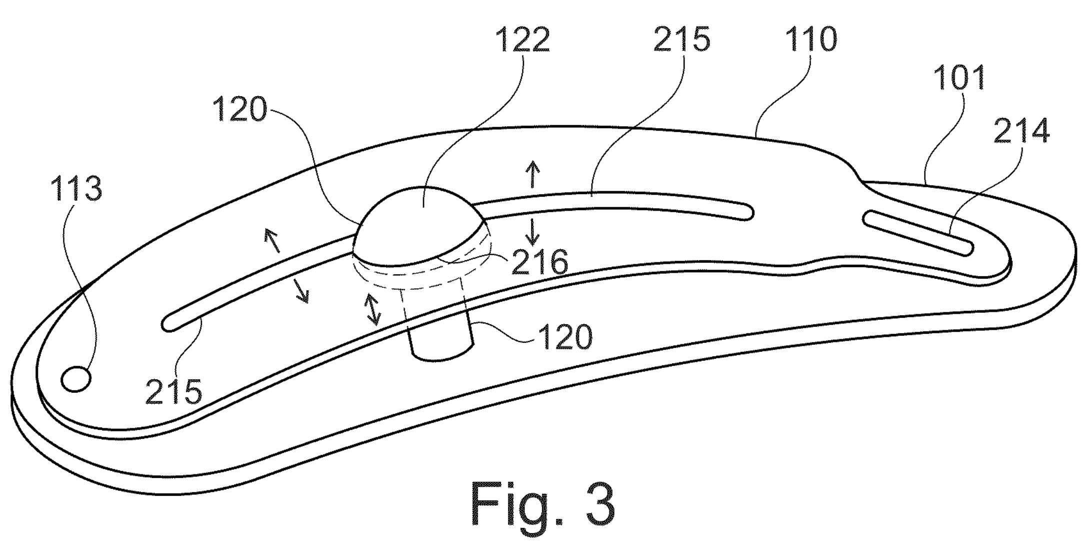

FIG. 3 shows a perspective illustration of a dummy device 100, in which the respiration simulation element 110 of FIG. 2 is attached at a torso element 101 by the attachment devices 113, 214. A drive element 120 in the form of a plunger is attached at the torso element 101. The plunger/drive element 120 may be moved, such that the respiration simulation element 110 is sequentially moved away from the torso element 101 and towards the torso element 101 with a respiratory frequency.

The plunger/drive element 120 comprises at its end which is facing away from the torso element 101, i.e., at its tip, an end part 122 which has an outwardly directed curvature. With a part of this curvature, the end part 122 extends in the recess 216 in the respiration simulation element 110. As indicated by the arrows, by the up-and-down motion of the end part 122, the respiration slit 215 can be extended and/or narrowed. By the extension and/or narrowing of the respiration slit 215, both halves of the respiration simulation element 110 which are formed by the respiration slit 215 respectively move in a lateral direction.

Figure 4:
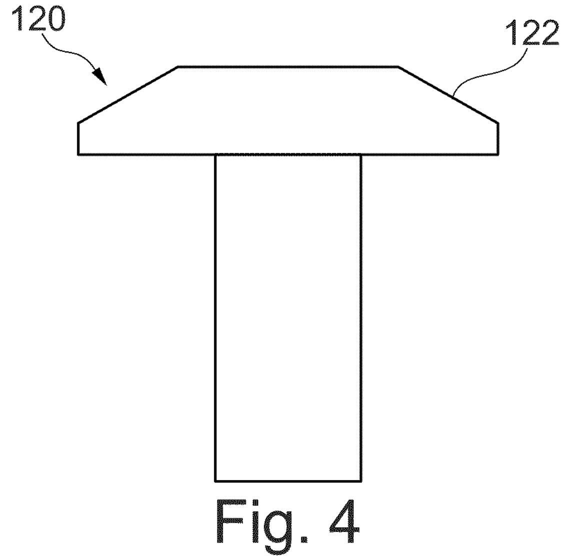
FIG. 4, FIG. 5, and FIG. 6 illustrate cross-sections of different embodiments of drive elements according to the disclosure.
Figure 5:
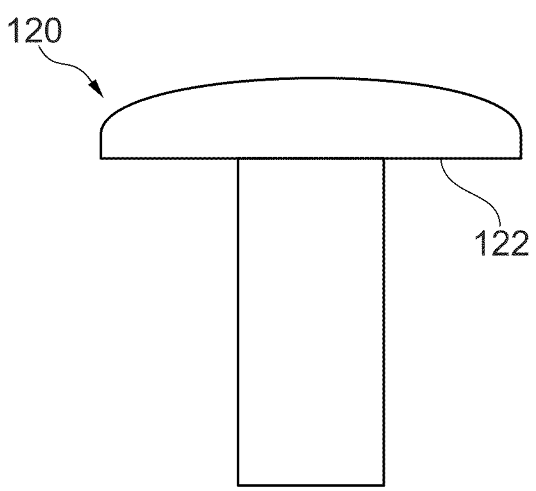
Figure 6:
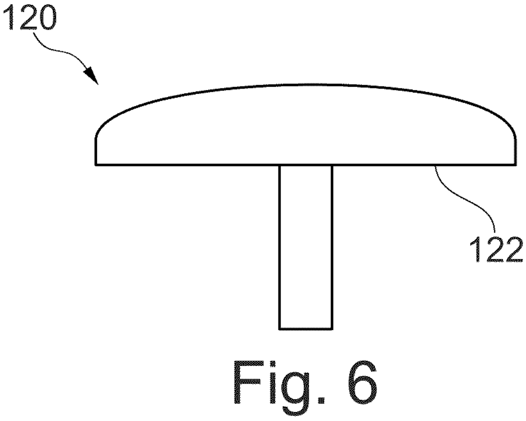

FIGS. 4 to 6 show cross-sections of different embodiments of drive elements 120. The drive elements respectively comprise an end part 122 which is placed on a cylindrical base part. In the FIGS. 4 and 5, the end part 122 respectively tapers with increasing distance to the torso element. In FIG. 4, a frustoconical form of the end part 122 is illustrated. In FIG. 5, the end part 122 comprises an outwardly directed curvature. In a plan view which is not illustrated here, the drive elements 120 of the FIGS. 4 and 5 (and inclusively the respective end parts 122) are rotationally symmetrical.

Finally, FIG. 6 shows an arc-shaped form of the end part 122. Such an arc-shaped end part 122 is for example suitable to, in case of a separation of the respiration simulation element into a plurality of ribs, distributes a force on the ribs. The arc-shaped end part 122 of FIG. 6 is typically not rotationally symmetrical in a plan view but comprises a main extension direction.

It should be noted that the term "comprising" does not exclude other elements or steps and the article "a" or "an" does not exclude a plurality. Also, elements described in association with different embodiments may be combined.

Implementation of the disclosure is not limited to the preferred embodiments shown in the figures described above. Instead, a multiplicity of variants are possible which variants use the solutions shown and the principle according to the disclosure even in the case of fundamentally different embodiments.

LIST OF REFERENCE SIGNS

100 dummy device
101 torso element
102 head element
103 neck joint
110 respiration simulation element
111 abdomen region

112 thorax region
113 attachment
214 attachment slit
215 respiration slit
216 recess
120 drive element
121 respiration simulation actuator
122 end part
130 extremity element
131 limb near to the torso
132 limb spaced apart from the torso
133 first limb part
134 second limb part
135 joint
136 further joint
137 extremity drive element
140 control unit
141 control cable
251 first pivoting point
252 second pivoting point
253 first further pivoting point
254 second further pivoting point

The invention claimed is:

1. A dummy device, comprising:

a torso element which reproduces a torso of a human;

a respiration simulation element which at least partially covers the torso element and which is movably arranged with respect to the torso element; and a drive element which is adapted to sequentially move the respiration simulation element away from the torso element and towards the torso element with a respiratory frequency, to simulate a motion characteristic of a human respiration;

wherein the motion characteristic comprises at least one of a respiratory frequency, a respiratory lifting, and a respiratory arrangement in an abdomen region and a thorax region, wherein the motion characteristic is indicative of at least one type of person selected from a baby, a toddler, a child or an adolescent, wherein the drive element is arranged in the abdomen region, wherein a ratio of a respiratory lifting in the thorax region to a respiratory lifting in the abdomen region is adjustable.

2. The dummy device according to claim 1, wherein the respiration simulation element at least partially covers the abdomen region of the torso element and the thorax region of the torso element.

3. The dummy device according to claim 1, wherein the drive element comprises at least one of an inflatable air bag and a plunger.

4. The dummy device according to claim 1, wherein the drive element comprises an end part which pushes against the respiration simulation element, wherein the end part extends at least partially in a recess of the respiration simulation element.

5. The dummy device according to claim 1, wherein the respiration simulation element comprises a plurality of ribs, and the drive element comprises an arc-shaped end part which pushes against the ribs.

6. The dummy device according to claim 1, wherein the respiration simulation element comprises at least one of a rib, a membrane, and a plate.

7. The dummy device according to claim 1, wherein the respiration simulation element comprises a respiration slit which widens when the respiration simulation element is moved away from the torso element by the drive element.

8. The dummy device according to claim 1, wherein a material of the respiration simulation element comprises an elastic modulus between 200 and 1400 MPa.

9. The dummy device according to claim 1, wherein the respiration simulation element is attached at the torso element by an attachment element, movably arranged in a rail and/or an attachment slit.

10. The dummy device according to claim 1, further comprising:

an extremity element which is movably connected with the torso element by a joint; and an extremity drive element which is adapted to move the extremity element around the joint, such that a further motion characteristic of a human extremity motion is simulated.

11. The dummy device according to claim 10, wherein the motion characteristic and/or the further motion characteristic are indicative for at least one of a deep sleep state, a state of light sleep, a wake-up state, a state of falling asleep, and a waking state.

12. The dummy device according to claim 10, wherein the motion characteristic and/or the further motion characteristic are indicative for at least one of a newborn, a baby, a toddler, a child, an adolescent, and an adult.

13. The dummy device according to claim 10, wherein the extremity drive element is adapted to irregularly move the extremity element around the joint independently from the motion of the respiration simulation element.

14. The dummy device according to claim 10, wherein the extremity drive element is adapted to move the extremity element depending on the motion of the respiration simulation element.

15. The dummy device according to claim 10, wherein the extremity element comprises a limb near to the torso, which is movably connected with the torso element by the joint at a first limb end, and a limb spaced apart from the torso, which is movably connected by a further joint with the limb near to the torso at a second limb end of the limb near the torso which is opposing to the first limb end.

16. The dummy device according to claim 15, wherein the limb which is near to the torso comprises a first limb part which connects a first pivoting point of the joint with a first further pivoting point of the further joint, and a second limb part which connects a second pivoting point of the joint with a second further pivoting point of the further joint.

17. A method for operating a dummy device, comprising:

providing a dummy device which comprises a torso element which reproduces a torso of a human, and a respiration simulation element which at least partially covers the torso element, and which is movably arranged with respect to the torso element; and moving a drive element of the dummy device, such that the respiration simulation element sequentially moves away from the torso element and towards the torso element with a respiratory frequency, to simulate a motion characteristic of a human respiration;

wherein the motion characteristic comprises at least one of a respiratory frequency, a respiratory lifting, and a respiratory arrangement in an abdomen region and a thorax region, wherein the motion characteristic is indicative of at least one type of person selected from a baby, a toddler, a child or an adolescent, wherein the drive element is arranged in the abdomen region, wherein a ration of a respiratory lifting in the thorax region to a respiratory lifting in the abdomen region is adjustable.

18. A dummy device, comprising:

a torso element which reproduces a torso of a human;

a respiration simulation element which at least partially covers the torso element and which is movably arranged with respect to the torso element; and a drive element which is adapted to sequentially move the respiration simulation element away from the torso element and towards the torso element with a respiratory frequency, to simulate a motion characteristic of a human respiration;

wherein the respiration simulation element comprises a respiration slit which widens when the respiration simulation element is moved away from the torso element by the drive element.

* * * * *